3,075,028
PARAFFIN ALKYLATION PROCESS
Alan K. Roebuck, Schererville, Ind., and Bernard L. Evering, Chicago, Ill., assignors to Standard Oil Company, Chicago, Ill., a corporation of Indiana
No Drawing. Filed Sept. 23, 1960, Ser. No. 57,898
13 Claims. (Cl. 260—683.53)

This invention relates to alkylation of olefins and isoparaffins utilizing aluminum chloride-dialkyl ether complex catalyst. More particularly, it relates to a process providing high octane number alkylate and improved catalyst life by the presence of an inhibitor.

There is presently known a process for product of alkylate by the reaction of olefins and isoparaffins in the presence of a liquid catalyst system commonly considered to be a complex of aluminum chloride and dialkyl ether. This catalyst system contains more than 1 mole of aluminum chloride per mole of ether but less than 2 moles of aluminum chloride per mole of ether. (The complex containing an equimolar amount of aluminum chloride and of ether is inactive.) This catalyst system reacts with the hydrocarbon charged to produce an aluminum chloride-hydrocarbon complex. The presence of this aluminum chloride-hydrocarbon complex decreases the activity of the ether complex catalyst system. It has been found that the octane number of the alkylate produced by reacting isoparaffins and olefins containing more than 2 carbon atoms can be greatly improved by having present in the reaction zone an aromatic hydrocarbon inhibitor; this inhibitor apparently suppresses the ability of the ether catalyst system to isomerize the initial product to isomers of lower octane number. The aromatic inhibitors increase the amount of aluminum chloride-hydrocarbon complex produced.

It is the object of this invention to utilize the above-described aluminum chloride-ether complex catalyst in a process which will permit high octane number product and a minimum of wastage of $AlCl_3$ to aluminum chloride-hydrocarbon complex. Other objects will become apparent in the course of the detailed description of the invention.

It has been discovered that alkylate of improved octane number and a slower build-up of aluminum chloride-hydrocarbon complex is obtained by having present a hereinafter defined metal halide in the liquid catalyst phase of an aluminum chloride-ether complex catalyst alkylation process involving an isoparaffin and an olefin containing more than 2 carbon atoms. The halogen from which the halide is derived is either chlorine, bromine or iodine. The metal ion of the halide is either calcium, lead, magnesium, mercurous, strontium and zirconium. The usage of salt is usually from about 0.1 to about 2 mole per mole of free-aluminum chloride present in the catalyst phase.

The process of the invention is applicable to olefins containing 3, 4 or 5 carbon atoms and mixtures of these olefins. The isoparaffins charged to the process of the invention contain 4 or 5 carbon atoms; mixtures of these may be used. Butene-2 is a particularly suitable olefin for the production of very high octane number alkylate product. Isobutane is the preferred isoparaffin. The isoparaffins and olefins may be contacted in the presence of the liquid catalyst phase in amounts such as are normally used for $AlCl_3$-type catalyst alkylation processes or any of the conventional acid catalyst systems such as sulfuric acid and hydrofluoric acid. In the process of the invention, the lower ratio of isoparaffin/olefin usually charged to the reaction zone is at least 3. Higher ratios are usually used. Under some conditions, the ratio of isoparaffin/olefin in the reaction zone may be as much as 200. More usually, this ratio, in the process of this invention, is from 3 to about 50.

The alkylation reaction is carried out in the liquid state and sufficient pressure is maintained on the system to keep the reactants essentially entirely liquid.

The alkylation reaction in the process of the invention may be carried out at a temperature such as is typical of $AlCl_3$-type alkylation processes. More specifically, herein, the reaction is at a temperature of from about 0° F. to about 70° F. In general, the octane number of the alkylate product increases as the temperature of the alkylation is lowered. It is preferred to operate at the lower end of the temperature range and suitably at 5–25° F.

The catalyst system utilized in the process of the invention consists essentially of aluminum chloride and a dialkyl ether. The catalyst system contains more than 1 mole of aluminum chloride per mole of ether; less than 2 moles of aluminum chloride are present per mole of ether. It is thought that the actual catalyst is aluminum chloride physically dissolved in an $AlCl_3$-ether complex which complex contains about 1 mole of $AlCl_3$ per mole of ether. The complex containing an equimolar amount of $AlCl_3$ and ether is completely inactive for promoting the alkylation of the defined olefins and isoparaffins. The presence of $AlCl_3$ beyond the 1:1 ratio requirement produces an active catalyst system.

(In the prior art the composition of the catalyst system has been set out in terms of the molar ratio of aluminum chloride to ether present in the catalyst phase present in the reaction zone. For clarity, hereinafter, the catalyst system will be defined as a 1:1 complex containing physically dissolved $AlCl_3$. This physically dissolved $AlCl_3$ is hereinafter referred to as "free-$AlCl_3$.")

Even a small amount of free-$AlCl_3$ results in catalytic activity. Activity of a substantial degree for many reactant combinations is obtained with about 3 weight percent of free $AlCl_3$ present. The free $AlCl_3$ content is always related to the amount of the 1:1 complex present in the reaction zone or in the catalyst preparation zone. Increasing the amount of free-$AlCl_3$ present has a beneficial effect on the activity and on catalyst activity maintenance. Usually, it is desirable to operate with a complex which is essentially saturated with free-$AlCl_3$ at the particular temperature of operation. For example, a complex formed from dimethyl ether or diethyl ether will dissolve about 15 weight percent of free-$AlCl_3$ at 75° F., i.e., 15 grams of $AlCl_3$ in 100 grams of 1:1 complex.

The liquid catalyst system is capable of maintaining in relatively stable dispersion, a considerable weight of finely divided aluminum chloride. It is thought that this dispersed solid aluminum chloride does not participate in the catalytic activity. However, as free-$AlCl_3$ is extracted from the catalyst phase either by reaction to produce aluminum chloride-hydrocarbon complex or by solution into the alkylate product leaving the reaction zone, the dispersed solid aluminum chloride dissolves and permits operation for a longer period at maximum catalyst activity. In general, it is preferred that the free-$AlCl_3$ content of the catalyst phase be maintained at the desired level by other well known techniques rather than by the presence of dispersed solid aluminum chloride in the catalyst phase.

The complex consists of aluminum chloride and dialkyl ether. In the process of the invention, it is preferred that the ether be a di-n-alkyl ether wherein each of the n-alkyl groups contains 1, 2, 3 or 4 carbon atoms. The particular n-alkyl groups are methyl, ethyl, n-propyl and n-butyl. Illustrative ethers are dimethyl ether, diethyl ether, methylethyl ether, di-n-propyl ether, methyl-n-propyl ether, and di-n-butyl ether. In low temperature operation, methylethyl ether or a physical mixture of dimethyl ether and diethyl ether have been found to be particularly useful. Another particularly suitable combination of ethers for use in low temperatures is the equilibrium mixture of diethyl ether, dimethyl ether and methylethyl ether from dehydration of an equimolar mixture of ethanol and methanol.

In the alkylation reaction zone, there is present a liquid catalyst phase. This phase includes the hereinbefore defined catalyst system. Also present is aluminum chloride-hydrocarbon complex formed by reaction of free-$AlCl_3$ and hydrocarbon. The hydrocarbon complex is almost completely miscible with the ether complex. The amount of hydrocarbon complex present is dependent upon the operating conditions and the inhibitor present.

A metal halide is also present in the catalyst phase, in the process of the invention. The metal halide contains the halide ion, chloride, bromide or iodide and the metal ion calcium, lead, magnesium, mercurous, strontium and zirconium. Although there is added to the catalyst phase the particularly defined metal halide, it is to be understood that the metal halide may not exist in the catalyst phase in the state in which it was added. (It has been observed that some fluorides of the above metal ions are effective inhibitors when added to the reaction zone—it is thought that a chloride salt is formed.) The salt is added in a substantially anhydrous form.

The metal halide inhibitor shows beneficial effects on octane number of the alkylate product and the amount of aluminum chloride-hydrocarbon complex formed as soon as any is added to the liquid catalyst phase in the reaction zone. The beneficial effect increases with increased amount of inhibitor added, up to a point. It appears that in most cases greatest benefits are obtained at a usage of about 1 mole of metal halide per mole of free-$AlCl_3$ present in the catalyst phase; more than this amount can be used, as much as 2 moles or more. Substantial improvements are obtained starting at about 0.1 mole of metal halide added. Not all of the metal halides give the same degree of improvement. Lead chloride and calcium chloride are outstandingly effective inhibitors.

The defined metal halides are soluble to a large extent in the catalyst system. It has been observed that the presence of olefin in the catalyst preparation zone greatly increases the "solubility" of the metal halide being added. The presence of metal halide in excess of that soluble in the liquid catalyst phase does not appear to have any deleterious effects.

The process of the invention produces substantial yield of alkylate of excellent octane number without the deliberate addition of halide promoter for $AlCl_3$-type catalyst. Suitable halide promoters are hydrogen chloride and alkyl halides such as t-butyl chloride. High catalyst activity and longer catalyst activity maintenance requires the presence of halide promoter. Hydrogen chloride is a preferred promoter. The amount of halide promoter added is dependent upon the particular conditions of operation. In general, the minimum amount of halide promoter is used. Illustrative of halide promoter usage is the addition of hydrogen chloride in an amount from 0.1 to 5 weight percent based upon the total hydrocarbon charged to the reaction zone, i.e., the sum of isoparaffin and olefin introduced into the reaction zone.

It is to be understood that the contacting of the reactants and the liquid catalyst phase may be carried out in any process vessel providing intimate intermingling of the hydrocarbon liquid and the liquid catalyst phase such as used in the alkylation art generally.

EXAMPLES

The process of the invention is illustrated by certain working examples carried out in a semi-batch operation. For purposes of comparison, a test utilizing the basic prior art process is set forth hereinafter.

All of the illustrations utilized essentially pure isobutane and butene-2 as the reactants. The complex was made up with CP aluminum chloride and an equimolar mixture of dimethyl ether and diethyl ether. The 1:1 $AlCl_3$-ether complex was fortified with aluminum chloride. The complex was essentially saturated with aluminum chloride: The 1:1 $AlCl_3$-ether complex was placed in a vessel provided with an agitator. The desired amount of $AlCl_3$ solid needed to form the free-$AlCl_3$ was then added. Hydrogen chloride was pressured into the vessel to 25 p.s.i.g. The presence of HCl greatly speeds up the rate of solution of solid $AlCl_3$ in the complex. The contents were stirred until the $AlCl_3$ had been dissolved; the HCl was then vented from the vessel. When metal halide was to be tested the metal halide was also added to the catalyst preparation vessel. Catalyst system (including metal halide) was then transferred to the reaction vessel, in the desired amount. The metal halide inhibitor was added, in the form of finely divided substantially anhydrous powder, to the catalyst system in the amount desired to provide the proper mole ratio of inhibitor to free-$AlCl_3$ present.

The reaction vessel was a 1 liter autoclave provided with four vertical baffles positioned at the wall to improve agitation provided by a 2" propeller driven at 1800 r.p.m. by an electric motor. The reaction vessel was positioned in a bath which permitted maintaining the reactor at the desired temperature.

In each test, 15 ml. of the catalyst system was added to the reactor along with 650 ml. of isobutane: All of the isobutane was present in the reactor. After the contents of the reactor had been brought to temperature, butene-2 was added to the reactor at a rate of 2 ml. per minute. A total of 120 ml. of butene-2 was charged over a period of one hour. After all of the olefin was added, the agitation was continued for 3–5 minutes. It was observed that the olefin reacted with great rapidity and the additional contacting time after olefin addition was stopped was more or less precautionary rather than necessary.

The propeller was stopped and the contents of the reactor permitted to settle. A siphon tube was used to remove substantially all of the isobutane and alkylate: This material was drawn off into a Dry Ice cooled vessel. Dry Ice was used to solidify the liquid catalyst phase present in the reactor. The liquid hydrocarbon remaining in the reactor was then decanted from the solid catalyst phase and added to the first quantity of hydrocarbon removed.

The isobutane was removed from the alkylate in a stabilizing column. The total alkylate bottoms were water washed to remove catalyst phase and then dried over potassium carbonate. The dried alkylate was weighed to obtain the yield in the particular test. In all tests reported herein, the yield of alkylate is the weight of total alkylate based on the weight of butene-2 charged.

The dried total alkylate was distilled to remove an overhead fraction having an ASTM distillation end point of 350° F. The fraction boiling above 350° F. end point is termed "heavy ends." The CFR–R clear octane number of the alkylate overhead product was obtained. In some tests, analysis by carbon number was obtained on the overhead alkylate product. In those tests which illustrate the invention herein, trimethylpentanes were in excess of 90% of the overhead alkylate product.

The amount of aluminum chloride-hydrocarbon complex formed during the particular test was determined as a measure of the catalyst life. The aluminum chloride-hydrocarbon complex was not determined as such. It has been determined that the amount of "red oil" present in the catalyst phase at the end of the test effectively demonstrates the amount of aluminum chloride-hydrocarbon complex formed. ("Red oil" is the hydrocarbon obtained by hydrolysis decomposition of an aluminum chloride-hydrocarbon complex.) The solidified catalyst phase was melted and weighed. The catalyst phase was then decomposed with water. A supernatent layer of liberated ether and red oil forms which supernatant layer was decanted away from the aqueous layer. The ether was separated from the red oil by distillation. The recovered red oil was weighed. The amount of red oil formed during the test is reported as weight percent based on the total catalyst phase existing in the reactor at the end of the test. This catalyst phase consists of aluminum chloride-ether complex, free-AlCl$_3$, aluminum chloride-hydrocarbon complex and trace amounts of hydrocarbon.

A number of metal halides were tested according to the above procedure at a temperature of 50° F. A comparison test wherein no metal halides was used was also made at this temperature. This series of tests (Series A) is reported in Table I.

*Table I (Series A)*

| Test No. | Inhibitor [1,4] | Yield Total Alkylate [2] | Clear CFR-R 350° F. Alkylate | Red Oil [3] |
|---|---|---|---|---|
| 1 | None | 212 | 93.4 | 8.8 |
| 2 | CaCl$_2$ | 202 | 100.5 | 2.4 |
| 3 | CaF$_2$ | 188 | 100.8 | 1.8 |
| 4 | MgCl$_2$ | 189 | 100.0 | 3.5 |
| 5 | HgCl | 188 | 98.5 | 2.6 |
| 6 | SrCl$_2$ | 192 | 99.3 | 4.1 |
| 7 | ZrCl$_4$ | 189 | 98.9 | 2.8 |
| 8 | CaCl$_2$ | 189 | 100.0 | 1.6 |

[1] Usage was 1 mole per mole of free-AlCl$_3$ in catalyst system containing 12% free-AlCl$_3$, except test 8 where the usage was 0.5 mole/mole.
[2] Weight percent based on butene-2 charged.
[3] Weight percent based on catalyst phase present at end of test.
[4] Tested under these conditions the following had insignificant or no inhibiting value: Antimony pentachloride, arsenic chloride, barium chloride, beryllium chloride, cobalt chloride, ferrous chloride, ferric chloride, mercuric chloride, nickel chloride, platinum chloride, tin tetrachloride, titanium tetrachloride, and zinc chloride.

Lead chloride was tested at 20° F. A comparative test without inhibitor was also made at this temperature. This series of tests (Series B) is reported in Table II.

*Table II (Series B)*

| Test No. | Inhibitor [1] | Yield Total Alkylate [2] | Clear CFR-R 350° F. Alkylate | Red Oil [3] |
|---|---|---|---|---|
| 9 | None | 188 | 96.4 | 4.7 |
| 10 | PbCl$_2$ | 190 | 102.4 | 2.7 |

See footnotes—Table I.

It is pointed out that all of the metal halides in the numbered tests, i.e., tests 2–8 and number 11 show very marked decrease in red oil formation even wherein only small octane number improvement is given. It is also pointed out that the calcium fluoride of test 3 gave results very similar to calcium chloride of test number 3. In test number 8, wherein the calcium chloride usage was ½ that of test number 2, substantially equivalent results were obtained.

TEST NUMBER 11

This test number 11 was carried out in a continuous manner utilizing the reactor of the earlier semi-batch test. In this continuous test, isobutane was charged at a rate of 720 ml. per hour and butene-2 was charged at a rate of 120 ml. per hour. The isobutane was passed through a vessel containing a complex of aluminum chloride, dimethyl ether and diethyl ether—no free-AlCl$_3$ was present. The purpose of dissolving complex in the isobutane was to replenish the reaction zone with complex to replace complex removed from the reaction zone in solution with the hydrocarbon effluent stream. By this procedure, at the end of the 4 hour continuous run, the 15 ml. of catalyst system present at the beginning was brought up to 17 ml. of liquid catalyst phase at the end of the run. Hydrogen chloride promoter was added to the reactor every 15 minutes. No particular care was exercised to control, accurately, the amount of HCl added; 2–10 grams were added in each dose. This test was carried out at the temperature of 10° F.

The test was terminated after 4 hours. The catalyst phase, at this time, was apparently as active as at the beginning of the run. The hydrocarbon effluent stream and the contents of the reactor were worked up in the same manner as described for the semi-batch test.

In this test, one mole of lead chloride was added to the catalyst system for each mole of free-aluminum chloride present, which free AlCl$_3$ amount was about 12% by weight of the complex.

The over-all yield of total alkylate based on butene-2 charged was 207%. The CFR-R clear octane number of the alkylate boiling below 350° F. was 102.3. The red oil formed during the run was 0.8 weight percent based on catalyst phase present at the end of the run. The total alkylate was analyzed for chlorine content; 1.07 weight percent, as Cl, of chlorine was present.

It has been observed that cuprous chloride and silver chloride behave in a unique fashion. These 2 metal halides not only are extremely effective inhibitors for octane number improvement and red oil suppression but have the additional very desirable property of suppressing heavy ends formation. This suppressing effect on heavy ends formation is particularly noticeable when the olefin charged to the alkylation process is fairly readily polymerized, for example, propylene and isobutylene.

When hydrogen chloride promoter is utilized in the process, a considerable amount of chloride appears in the alkylate product. This chlorine content has an adverse effect on the response of the alkylate to tetraethyl lead. In order to obtain the maximum octane number benefits of the process, it is necessary to remove essentially all of the chlorine content of the alkylate. It has been discovered that the chlorine content of the alkylate can be brought to levels well below 0.1 weight percent and even below 0.02 weight percent by distillation operation. The alkylate is fractionated to take overhead all the material boiling below 2,2,4-trimethylpentane. The chlorine portion of the alkylate appears between the isopentane taken overhead and the defined trimethylpentane.

To illustrate this chlorine removal procedure, a total alkylate containing 1.02 weight percent of chlorine as Cl was fractionated. The overhead fraction was 5.7 volume percent of the total alkylate. The chlorine content of the "topped" alkylate was 0.01 weight percent.

The overhead fraction was analyzed and found to be about 45 weight percent of organo chlorides. These chlorides were approximately equally divided between t-butylchloride and 2-chlorobutane. The hydrocarbons were isopentane, dimethylpentane and 2,2,4-trimethylpentane.

This distillative procedure resulted in an octane gain of 2.4 numbers.

Thus, having described the invention, what is claimed is:

1. An alkylation process comprising reacting an olefin containing 3–5 carbon atoms and an isoparaffin containing 4–5 carbon atoms, in the liquid state, in the presence of a liquid catalyst phase consisting essentially of an AlCl$_3$-ether complex, free-AlCl$_3$ dissolved in said complex and metal halide inhibitor wherein said halide ion is selected from the class consisting of chloride, bromide and iodide and said metal ion is selected from the class consisting of calcium, lead, magnesium, mercurous, strontium and zirconium said metal halide being added in an amount of about 0.1–2 mole per mole of aluminum chloride present in excess of one mole per mole of said ether, said ether being di-n-alkyl ether containing 1–4 carbon atoms in each alkyl group, and said complex containing to two mole of AlCl$_3$ per mole of ether, and of a halide promoter for AlCl$_3$-type catalyst, to obtain an alkylate product.

2. The process of claim 1 wherein said inhibitor is lead chloride.

3. The process of claim 1 wherein said inhibitor is calcium chloride.

4. The process of claim 1 wherein said ether is dimethyl ether.

5. The process of claim 1 wherein said ether is diethyl ether.

6. The process of claim 1 wherein said ether is methylethyl ether.

7. An alkylation process comprising contacting, in the liquid state, an olefin having 3–5 carbon atoms and an isoparaffin having 4–5 carbon atoms in a mole ratio of isoparaffin/olefin of at least 3, at a temperature from about 0° F. to about 70° F., to obtain a branched chain alkylate, said contacting being carried out in the presence of a liquid catalyst phase consisting essentially of $AlCl_3$-di-n-alkyl ether complex containing about one mole of $AlCl_3$ per mole of ether, each of said n-alkyl groups containing 1–4 carbon atoms, free-$AlCl_3$ dissolved in said complex in an amount of from about 0.5 weight percent, based on said complex, to the saturation amount at the temperature of operation, and about 0.1–2 moles of metal chloride inhibitor per mole of said free-$AlCl_3$, said metal ion being selected from the class consisting of calcium, lead, magnesium, mercurous, strontium and zirconium and hydrogen chloride promoter for the catalyst, and recovering said alkylate from catalyst phase and unreacted hydrocarbons.

8. The process of claim 7 wherein said inhibitor amount is about 1 mole per mole of said free-$AlCl_3$.

9. The process of claim 7 wherein said temperature is about 5–25° F.

10. The process of claim 7 wherein said metal halide is lead chloride.

11. The process of claim 7 wherein said ether is about the equilibrium mixture of dimethyl ether, diethyl ether and methylethyl ether.

12. The process of claim 7 wherein said isoparaffin is isobutane.

13. The process of claim 12 wherein said olefin is butene-2.

References Cited in the file of this patent

UNITED STATES PATENTS

| | | |
|---|---|---|
| 2,211,207 | Ipatieff et al. | Aug. 13, 1940 |
| 2,897,248 | Roebuck et al. | July 28, 1959 |
| 3,014,083 | Roebuck et al. | Dec. 19, 1961 |

UNITED STATES PATENT OFFICE
CERTIFICATE OF CORRECTION

Patent No. 3,075,028                 January 22, 1963

Alan K. Roebuck et al.

It is hereby certified that error appears in the above numbered patent requiring correction and that the said Letters Patent should read as corrected below.

Column 6, lines 68 and 69, after "containing" insert -- about one --.

Signed and sealed this 27th day of August 1963.

(SEAL)
Attest:

ERNEST W. SWIDER                         DAVID L. LADD
Attesting Officer                             Commissioner of Patents